United States Patent Office 3,056,591
Patented Oct. 2, 1962

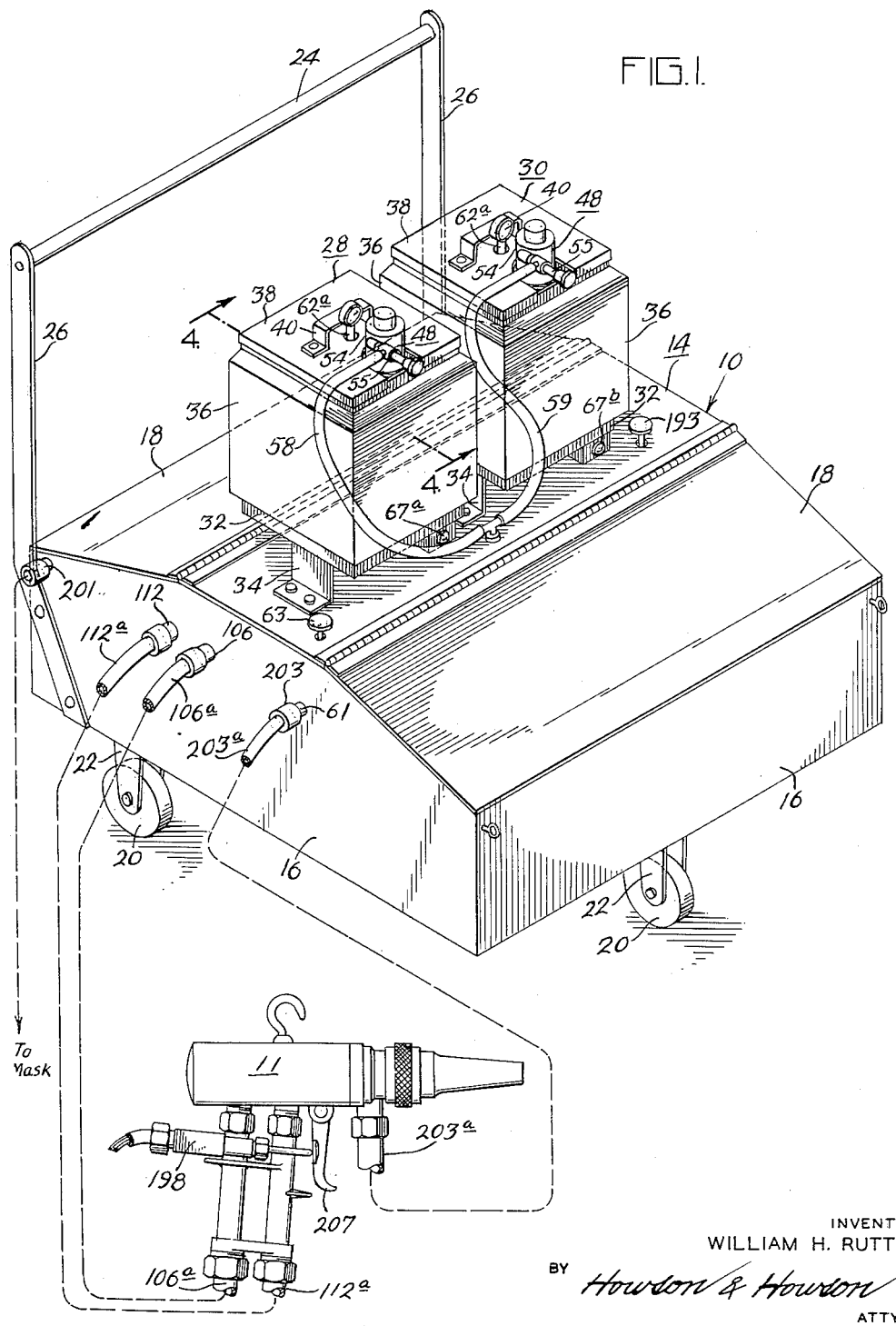

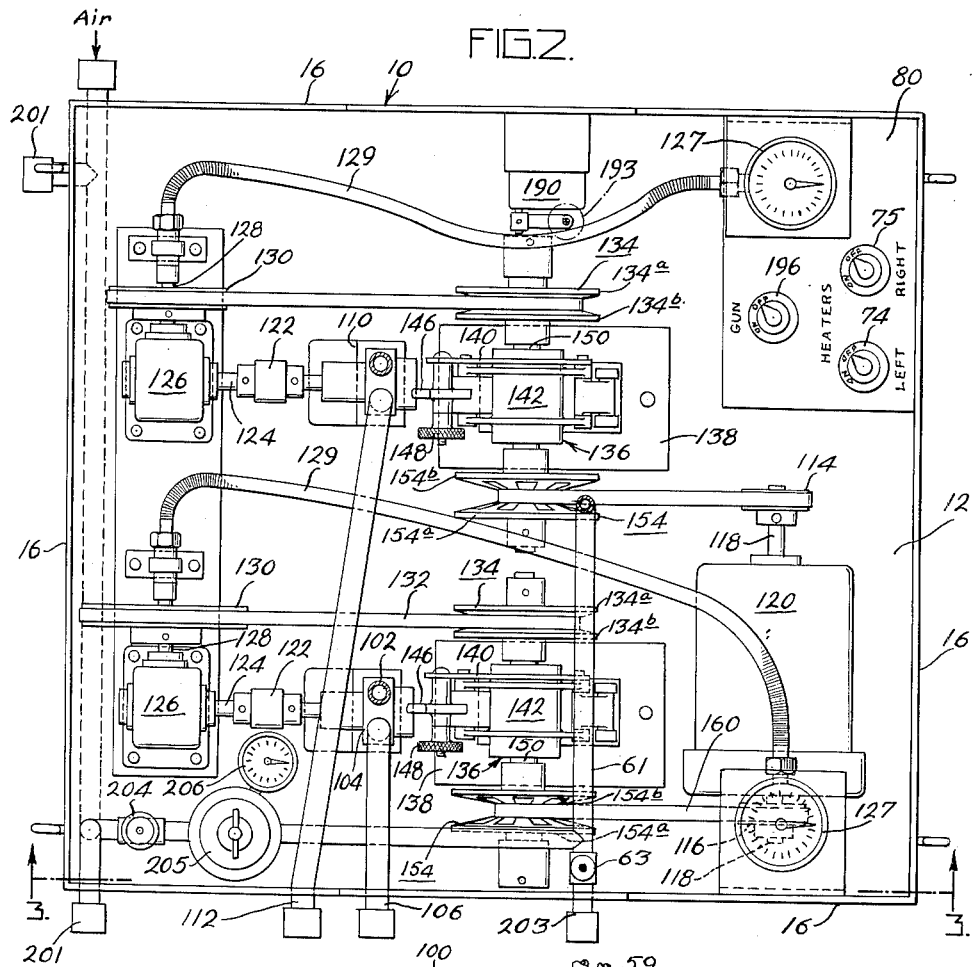

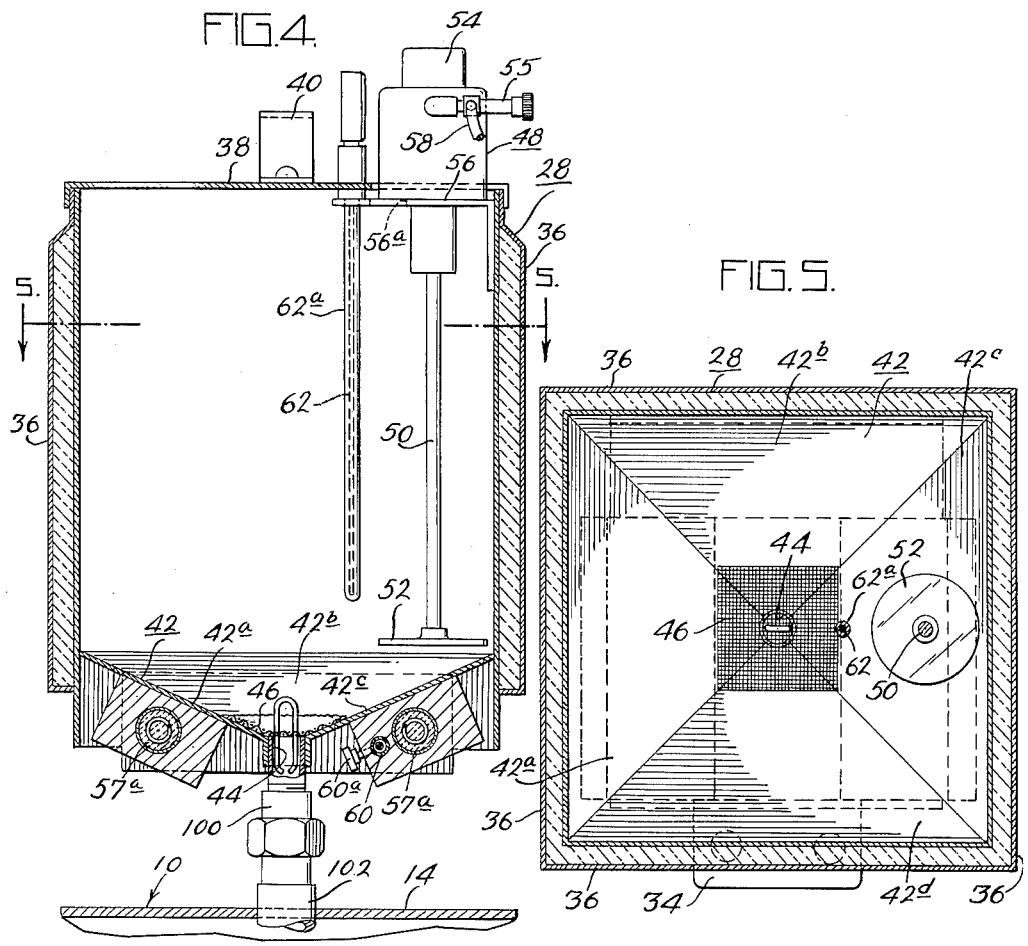

3,056,591
SYSTEM AND APPARATUS FOR PREPARING AND SUPPLYING MATERIALS TO AN APPLICATOR
William H. Rutter, Allentown, Pa., assignor to Electro Chemical Engineering & Mfg. Co., Emmaus, Pa., a corporation of Delaware
Filed Dec. 2, 1959, Ser. No. 856,692
5 Claims. (Cl. 259—60)

The present invention relates to a system and apparatus for preparing and supplying components of a multi-component fluid mixture to an applicator such as a spray gun, and more particularly to a portable system and apparatus of the above type which is simple, lightweight, compact and easily maneuverable by a user. The apparatus and system are especially suitable as a preparation and supply means for separately feeding for example, a prepolymer consisting of a resin di-isocyanate reaction product and a premix comprising a resin, foaming agent, wetting agent and catalyst to an applicator such as a spray gun wherein the materials are comingled and discharged to produce a urethane foam.

An object of the present invention is to provide a system and apparatus for preparing and supplying the components of a multi-component mixture to a discharge apparatus, such as a spray gun, which is of comparatively simple construction, lightweight, compact and easily maneuverable by the user and highly efficient and useful for the purposes intended.

Another object of the present invention is the provision of a system and apparatus for preparation and supplying of a prepolymer and premix material wherein means are provided for controlling the quantity of each component supplied to the applicator.

A further object of the present invention is to provide a system and apparatus of the type disclosed above wherein heating and agitating means are provided to maintain the premix and prepolymer at the desired viscosity so that when the materials are comingled, the mixture possesses the desired characteristics.

A still further object of the present invention is to provide a light, compact, maneuverable and easy to maintain unit that insures a proper preparation and metering of the prepolymer and premix materials in the desired proportions, and insures application of a urethane foam having fine uniform cell structure.

These and other objects of the present invention and the various details of the operation and construction thereof are hereinafter more fully set forth with reference to the accompanying drawings, in which:

FIG. 1 is a perspective view of the preparation and supply apparatus of the present invention connected schematically to an applicator such as a spray gun;

FIG. 2 is a top plan view of the multi-material preparation and supply apparatus of the present invention, with an outer cover removed;

FIG. 3 is a sectional view taken along line 3—3 of FIG. 2;

FIG. 4 is an enlarged sectional view taken along line 4—4 of FIG. 1;

FIG. 5 is a sectional view taken on line 5—5 of FIG. 4; and

FIG. 6 is a schematic of the electrical circuit for the heating and motor actuating means of the system.

Referring now to the drawings, FIG. 1 shows the apparatus embodying the preparation and supply system of the present invention for feeding the components of a multi-component material, attached to a spray gun adapted to apply the mixed materials to a surface to be coated. The details of the construction of the spray gun are specifically set forth in a copending application of the present applicant, entitled "Spray Gun," assigned to a common assignee with the present application, Serial No. 851,404, filed November 6, 1959, now Patent No. 3,010,658, to which reference may be made for this construction. Briefly, however, the spray gun consists of premix and prepolymer chambers connected by means of supply lines to the preparation and supply apparatus of the present invention. The chambers have discharge portions which are in fluid communication with a mixing chamber wherein the materials are comingled. Discharge openings are provided which connect the mixing chamber with the nozzle through which the material is discharged to the surface to be coated.

The system of the present invention broadly contemplates provision of a plurality of reservoirs for the components of the material to be mixed and means for maintaining the components at a predetermined viscosity. Conduits connect each of the supply reservoirs with, for example, the prepolymer and premix chambers of the spray gun. Pump means operatively associated with each of the conduits are provided for metering predetermined amounts of each of the components to the spray gun. Drive means connected to the pumps and means for controlling actuation of the drive means are provided so that predetermined quantities of each of the components may be metered to the spray gun. Suitable electrical circuits connect the metering means with a switch on the apparatus for actuation of the system independently of the spray gun and also for operation of the system through a switch on the spray gun.

Referring now in detail to the drawings, the present invention comprises a housing 10 having integral bottom, top and side walls 12, 14 and 16 respectively, and a pair of doors 18 hingedly connected to the top wall 14 to provide access to the interior of the housing 10. The housing 10 is supported on wheels 20 rotatably mounted in supports 22 such that the housing may be easily maneuvered by a user from one location to another. Additionally, a handle 24 mounted on brackets 26 secured to the side wall 16 of the housing and extending upwardly therefrom is provided to facilitate maneuverability of the apparatus.

In accordance with the present invention, means are provided to meter the components of a mixture from separate supply sources to an applicator such as a spray gun 11. In the present instance two reservoirs 28 and 30 are shown, adapted to contain for example, a premix material and a prepolymer material. The reservoirs are supported on platforms 32 which are spaced from the top wall 14 of the housing by means of brackets 34. With reference to FIG. 4, each of the reservoirs is formed by upstanding side walls 36 which may be suitably insulated, as shown, and a removable lid 38, having a handle 40, to close the accessible top of the reservoir. The bottom wall 42 of the reservoir consists of four sections 42a, 42b, 42c, 42d arranged so that the bottom diverges downwardly toward a central discharge opening 44 which has a screen covering 46 to preclude passage of foreign matter into the system. The interiors of the reservoirs may be coated with fluoroethylene polymer so that they may be easily cleaned when it is desired.

Means are provided for maintaining the fluid in the reservoirs at a predetermined viscosity. To this end an agitator 48 includes a shaft 50 mounting on its outer end a stirrer 52, and an air-operated agitator motor 54 for actuating the stirrer is mounted in the reservoir by means of a bracket 56. The pneumatic motors 54 for actuating the agitating devices of the premix and prepolymer reservoirs are connected through lines 58 and 59 to a conduit 61 leading to an air supply source. A valve 55 mounted directly on the air motor 54 controls its operation. A valve 63 is provided in conduit 61 to manually shut off and on the air to the gun.

Heating means for controlling the temperature of the material in the reservoir is provided. This means comprises a pair of heaters 57a and 57b mounted on the bottom wall 42 of the reservoir. Thermostat 60 mounted alongside of heaters 57a and 57b with a knob 60a for adjustment to desired temperatures are connected to the heaters through an electrical connection (explained hereinafter) for maintaining the temperature of the fluid at a predetermined level. The heating and agitating means provide for the desired control of the viscosity of the fluid in the reservoir. A direct reading thermometer 62 is mounted in a receptacle 62a on motor support 56.

FIG. 6 illustrates schematically the electrical circuit for the prepolymer and premix heaters. As shown the premix and prepolymer reservoirs are provided each with a pair of heaters 57a and 57b respectively. Leads 64a and 64b connect the heaters to a line 65 which is connected to an electrical source 66. Lights 67a and 67b are connected in the leads as indicators of current to heaters 57a and 57b. Heaters 57a are connected in series with a thermostat control switch 60a which through lead 71 is connected to the main premix heater switch 74 mounted on the panel 80. The prepolymer heaters 57b are similarly connected in series to a thermostat control switch 60b which through lead 73 is connected to the main prepolymer heater switch 75. Switches 74 and 75 are connected through lead 77 and to the electrical source 66 through lead 79 to complete the circuit.

Another important feature of the present invention is the provision of means for metering predetermined amounts of the prepolymer material and premix material to the spray gun. To this end the premix reservoir 28 is connected through discharge connection 100 and conduit 102 to the input side of a pump 104. Conduit 106 connects the output side of the pump 104 through hose 106a with the premix chamber of the spray gun 11. The prepolymer reservoir is similarly connected through a discharge connection and conduit to the input side of pump 110 and thence through conduit 112 and hose 112a to the prepolymer chamber of the spray gun 11. The pumps 104 and 110 are connected through transmission means to the outer ends 114 and 116 of the output shaft 118 of an electric motor 120. Since elements and parts comprising the transmission means for the pumps 104 and 110 are identical in construction, the system for one of the pumps, the premix pump, will be described, and identical reference numerals applied to the other system.

The details of the construction of the transmission means will be more clearly apparent from FIGS. 2 and 3 of the drawings. The premix pump 104 is connected through coupling 122 and shaft 124 to a speed reducer 126. Shaft 128 which is geared to the shaft 124, within the reducer 126, mounts a pulley 130 at its outer end. Belt 132 connects the pulley 130 with the output pulley 134 of a variable speed drive mechanism 136. The variable speed drive mechanism consists of a rigid frame formed by a base portion 138 secured to the bottom wall of the housing and upstanding support members 140 which mount the drive housing 142. The support members 140 are provided with slotted openings 144 within which a connection member of a positioning handle 146 pivotally connected to the base 138 and to the drive housing 142 is adapted to be actuated, and provides a means for selectively positioning the housing with respect to the frame. A fastening screw 148 is provided to secure the handle with respect to the frame when the housing is moved to the desired position.

A shaft 150 is rotatably mounted in the housing 142 and mounts pulley 134 at its output end, and pulley 154 at its input end. The pulleys comprise stationary sheave members 134a and 154a respectively, and movable sheave members 134b and 154b respectively. The movable sheave members of the pulley are keyed to the shaft and adapted to be actuated axially thereof, and are normally urged toward their respective fixed sheave members by means of springs, not shown. The input pulley 154 of the variable speed drive mechanism is connected through belt 160 to the output shaft 118 of the electric motor 120. The variable speed drive mechanism provides a means for selectively varying the output of each of the pumps 104 and 110 when it is desired. For example, it may be seen with respect to FIG. 2, by loosening the screw 148, the housing may be moved either to the right or to the left to either increase or decrease the r.p.m.'s of the input pulley, thereby proportionately increasing or decreasing the r.p.m.'s transmitted to the pulley 130 on the reducer shaft 128. For example with the drive housing 142 in the extreme left hand position as shown in FIGS. 2 and 3, the sheaves 154a, 154b on the input end of the shaft 150 are spaced apart a maximum and the sheaves 134a, 134b are spaced apart a minimum. In this position for a given r.p.m. of the motor shaft 118 the r.p.m.'s transmitted to the reducer shaft 128 through the transmission mechanism are a maximum and accordingly the output of the pump 126 is at a maximum. Movement of the drive housing 142 to the right with respect to FIGS. 2 and 3 causes the sheaves 154a, 154b to move closer to one another and the sheaves 134a, 134b to spread apart. This effects a decrease in the r.p.m.'s transmitted to the reducer shaft 128 for the same motor shaft r.p.m. and accordingly a decrease in the output of the pump 126. In order to determine when the desired adjustment has been realized, speed indicator means 127 are connected to the shaft 128 through a flexible coupling 129. Therefore, it is readily apparent that through a continuously operating motor 120 various outputs can be effected with regard to the pumps 104 and 110, and accordingly the ratio of premix to prepolymer may be controlled within very close limits whenever it is desired.

Main switch 190, which is an on-off switch, is connected through lead 191 to the electrical supply source 66. The switch 190 is mounted in the housing and has a button 193 protruding through the upper wall thereof for actuating the switch. Line 194 connects the switch 190 in series with a single pole double throw switch 196 which is mounted on the panel 80. The contacts of switch 196 are connected in series with the contacts of a gun switch 198 through leads 197. Switch 196 is connected through lead 199 to one side of motor 120. To complete the circuit the other end of the motor is connected by the lead 200 to the source of energy 66.

Conduit 61 is also provided with air outlet connections 201 to which may be attached lines for masks and an outlet 203 for a line 203a leading to the air chamber of the gun 11. A control valve 204 is positioned in the conduit intermediate the outlets. A regulator 205 and air pressure gauge 206 are positioned in the conduit 61 between valve 63 and valve 204.

In the operation of the system assume that the prepolymer and premix reservoirs are filled with material. The materials are prepared for metering through the system by actuation of the mixing or agitating mechanism by opening the air valve 204. Additionally, the premix and prepolymer heaters are actuated by turning on switches 74 and 75. It is, of course, clear from the schematic that either of the heaters can be operated independently of the other. Also, by setting the thermostatic control at the desired temperature for each of the materials it may be seen that from this point on the switches 70a and 70b effect automatic maintenance of the materials at the predetermined fixed temperature. For example, with reference to FIG. 6, when the prepolymer or premix have been heated to the desired temperature, the switches 70a or 70b will be automatically actuated through the thermostats to open the circuit and shut off the heaters. Thereafter, when the temperature is lowered, the heaters will automatically be cut in through the temperature control switches 70a or 70b. The lights 67a and 67b in series with the heaters indicate when the heaters are in operation.

When preparing the apparatus for use, it may be desirable to meter some of the prepolymer and premix materials through the lines in a test run and to properly mix each material and facilitate evenness of temperature and proper viscosity. When doing this the user removes the lids 38 and inserts the ends of the connecting hoses 106a and 112a in the openings 56a in the motor support brackets 56, the gun 11 being disconnected, and begins operation of the pumps by turning on switch 190, and placing the switch 196 on the panel in the "on" position to actuate the motor. After having cycled some of the materials through the reservoir, the connecting lines are connected to the spray gun and switch 196 is switched to the "off" position, thereby transferring control of the motor to the gun switch 198. Thereafter, by opening the air valve to permit passage of air through the air chamber and selective actuation of switch 198 upon actuation of trigger mechanism 207, the gun is ready to be used.

From the foregoing it is apparent that the system and apparatus of the present invention provide a novel improvement in preparation and supply apparatus for feeding components of a fluid mixture to an applicator wherein the viscosity of the materials may be controlled within close limits so that the optimum desirable characteristic of the mixture are produced and also wherein predetermined quantities of each of the components may be metered to the applicator.

While a particular embodiment of the invention has been illustrated and described, it is not intended to limit the invention to such disclosure and changes and modifications may be incorporated and embodied therein within the scope of the following claims.

I claim:

1. A system for preparing and supplying components of a multi-component fluid mixture to an applicator comprising; a supply reservoir for each of said components, means for maintaining the components in the system at a predetermined viscosity, conduit means for each component having an inlet end connected to the respective supply reservoir for the component and an outlet end connected to the applicator, a pump operatively associated with each said conduit for metering said components to said applicator, a single motor for operating all of said pumps, separate transmission means connecting each of said pumps with the motor, and means for controlling each of said transmission means from a single motor source to selectively vary actuation thereof so that predetermined quantities of each component may be metered to said applicator.

2. A system in accordance with claim 1 wherein said transmission means includes a variable speed drive and a gear reduction device connected in series with the motor and the pumps.

3. A system in accordance with claim 2 including a housing for the system, said housing mounted on wheels so that it may be maneuvered from one location to another, an air supply source and a conduit connecting the air source and the applicator to discharge the components from the applicator.

4. A system according to claim 1, wherein the outlet end of each of the conduits is detachably connected to the applicator and operable to be selectively positioned in the respective supply reservoir of the component to recirculate the component in a closed circuit.

5. Apparatus for preparing and supplying components of a multi-component fluid mixture to an applicator comprising, a portable housing, a supply reservoir for each of said components mounted on said housing, conduit means for each component having an inlet end connected to the respective reservoir for the component and an outlet end detachably connected to the applicator, a pump for each said conduit mounted in said housing operable to meter said components to said applicator, a single motor in said housing for operating all of said pumps, separate transmission means in said housing respectively connecting each of said pumps with the motor, and means for controlling each of said transmission means from said single motor source to selectively vary actuation thereof so that predetermined quantities of each component may be metered to said applicator.

References Cited in the file of this patent

UNITED STATES PATENTS

| | | |
|---|---|---|
| 525,632 | Splittstoser | Sept. 4, 1894 |
| 2,022,481 | Schellenger | Nov. 26, 1935 |
| 2,142,062 | Thurman | Dec. 27, 1938 |
| 2,157,757 | Jacobsen | May 9, 1939 |
| 2,157,758 | Jacobsen | May 9, 1939 |
| 2,705,132 | Neville | Mar. 29, 1955 |
| 2,752,123 | Deuschel et al. | June 26, 1956 |
| 2,754,228 | Bede | July 10, 1956 |
| 2,802,648 | Christensen et al. | Aug. 13, 1957 |
| 2,847,196 | Franklin et al. | Aug. 12, 1958 |
| 2,898,092 | Miller et al. | Aug. 4, 1959 |
| 2,903,248 | Walker | Sept. 8, 1959 |
| 2,927,450 | Pool | Mar. 8, 1960 |